(12) United States Patent
Kim et al.

(10) Patent No.: US 8,477,938 B2
(45) Date of Patent: Jul. 2, 2013

(54) METHOD AND APPARATUS FOR AUTHENTICATION OF PORTABLE ELECTRONIC DEVICES

(75) Inventors: Won-tae Kim, Seoul (KR); Dong-kwon Kim, Seoul (KR); Tae-hwan Kim, Seongnam-si (KR)

(73) Assignee: Neo-Freeline Inc., Seoul (KR)

( * ) Notice: Subject to any disclaimer, the term of this patent is extended or adjusted under 35 U.S.C. 154(b) by 1200 days.

(21) Appl. No.: 12/374,464

(22) PCT Filed: Jul. 20, 2007

(86) PCT No.: PCT/KR2007/003526
§ 371 (c)(1),
(2), (4) Date: Jan. 20, 2009

(87) PCT Pub. No.: WO2008/010693
PCT Pub. Date: Jan. 24, 2008

(65) Prior Publication Data
US 2009/0310781 A1     Dec. 17, 2009

(30) Foreign Application Priority Data
Jul. 21, 2006   (KR) .................. 10-2006-0068600

(51) Int. Cl.
*H04K 1/00*    (2006.01)
(52) U.S. Cl.
USPC ........................................... 380/247; 726/28
(58) Field of Classification Search
USPC ....................................................... 380/247
See application file for complete search history.

(56) References Cited

U.S. PATENT DOCUMENTS

| | | | | |
|---|---|---|---|---|
| 6,308,268 | B1 * | 10/2001 | Audebert | 713/182 |
| 6,591,098 | B1 * | 7/2003 | Shieh et al. | 455/419 |
| 6,611,913 | B1 * | 8/2003 | Carroll et al. | 713/171 |
| 2003/0151501 | A1 * | 8/2003 | Teckchandani et al. | 340/426.19 |
| 2005/0271255 | A1 * | 12/2005 | Ikegami et al. | 382/115 |

FOREIGN PATENT DOCUMENTS

| | | |
|---|---|---|
| EP | 0939514 | 9/1999 |
| EP | 1258801 | 11/2002 |
| KR | 2005-0089504 | 9/2005 |

OTHER PUBLICATIONS

Santiago Led; Design of a Wearable Device for ECG Continuous Monitoring Using WirelessTechnology; IEEE; Sep. 1-5, 2004pp. 1-4.*

* cited by examiner

*Primary Examiner* — Mohammad W Reza
*Assistant Examiner* — Monjour Rahim
(74) *Attorney, Agent, or Firm* — IPLA P.A.; James E. Bame

(57) ABSTRACT

A mobile communication terminal connected to the portable electronic device encodes a system serial number and an authentication key, generates an integration secrete key, and transmits the integration secrete key to an authentication center computer. The authentication center computer decodes the integration secrete key, performs authentication registration, encodes a temporary service approval key and a temporary integration authentication key, and transmits the temporary service approval key and the temporary integration authentication key to the mobile communication terminal. The mobile communication terminal decodes the temporary integration authentication key, obtains approval for the relay, and transmits the temporary service approval key to the portable electronic device. The portable electronic device decodes the temporary service approval key, performs authentication for utilizing a service, and applies the temporary service approval key to an application service.

7 Claims, 4 Drawing Sheets

METHOD AND APPARATUS FOR AUTHENTICATION OF PORTABLE ELECTRONIC DEVICES

TECHNICAL FIELD

The present invention relates to an authentication method and apparatus, and more particularly, to an authentication method and apparatus of a portable electronic device, which are capable of performing authentication processes of a variety of portable electronic devices including a navigation device, a digital multimedia broadcasting (DMB) device, a portable multimedia player (PMP), an MP3 player, a game device and a digital camera using a mobile communication terminal.

BACKGROUND ART

Recently, as communication environments have rapidly been developed, many users have used a variety of portable electronic devices including a navigation device, a DMB device, a PMP, an MP3 player, a game device and a digital camera.

A portable electronic device should be used using a variety of digital contents suitable for the device. In order to use the digital contents, an authentication process should be first performed.

Among conventional portable electronic devices, a portable electronic device including a communication function for directly performing communication with an external authentication center can perform an authentication process for utilizing digital contents, but a portable electronic device which does not include a communication function for directly performing communication with an external authentication center is unlikely to perform an authentication process for utilizing digital contents.

Accordingly, there is a need for a system for collectively managing authentication processes of a variety of portable electronic devices of users.

DISCLOSURE OF INVENTION

Technical Problem

Therefore, the present invention has been made in view of the above problems, and it is an object of the present invention to provide an authentication method and apparatus of a portable electronic device, which are capable of performing authentication processes of a variety of portable electronic devices including a navigation device, a digital multimedia broadcasting (DMB) device, a portable multimedia player (PMP), an MP3 player, a game device and a digital camera using a mobile communication terminal.

It is another object of the present invention to provide an authentication method and apparatus of a portable electronic device, which are capable of preventing fraudulent misuse of digital contents by previously registering information necessary for authentication of the mobile communication terminal and a variety of portable electronic devices and connecting to an authentication center (or a service provider) through the mobile communication terminal to perform the authentication process of the portable electronic device.

Technical Solution

In accordance with an aspect of the present invention, the above and other objects can be accomplished by the provision of authentication method of a portable electronic device, the authentication method including: (1) at the portable electronic device which requires authentication for utilizing a predetermined application, transmitting a system serial number stored previously to a mobile communication terminal; (2) at the mobile communication terminal, encoding the system serial number received from the portable electronic device and an authentication key previously stored in the mobile communication terminal, generating an integration secrete key, performing communication connection with an authentication center computer, and transmitting the integration secrete key to the authentication center computer; (3) at the authentication center computer, decoding the integration secrete key received from the mobile communication terminal, performing authentication registration, encoding a temporary service approval key which can be used by the portable electronic device and a temporary integration authentication key for approving relay of the mobile communication terminal, and transmitting the temporary service approval key and the temporary integration authentication key to the mobile communication terminal; (4) at the mobile communication terminal, decoding the temporary integration authentication key received from the authentication center computer, obtaining approval for the relay of the mobile communication terminal, encoding the temporary service approval key, and transmitting the temporary service approval key to the portable electronic device; and (5) at the portable electronic device, decoding the temporary service approval key received from the mobile communication terminal, performing authentication for utilizing a service, and applying the temporary service approval key to an application desired by a user to utilize the service.

The authentication method may further include, after the step (5), (6) at the portable electronic device, if receiving a call over the mobile communication terminal while a predetermined application is utilized by the portable electronic device, displaying information that the call is being received on a screen and performing a multitasking process which allows a user to continuously utilize the application while a telephone conversation is made over the mobile communication terminal.

In the multitasking process of the step (6), the application service which is currently being provided may pause when the telephone conversation is made over the mobile communication terminal and may be resumed after the telephone conversation of the user is terminated.

In accordance with another aspect of the present invention, there is provided An authentication apparatus of a portable electronic device, the authentication apparatus including: a communication network which performs data communication relating to authentication via a plurality of communication lines; the portable electronic device which stores registration information including a system serial number used for authentication, transmits the system serial number to a mobile communication terminal connected by wire or wirelessly when authentication is required, receives an encoded temporary service authentication key from the mobile communication terminal, decoding the encoded temporary service authentication key, and applies the decoded temporary service authentication key to an application desired by a user to utilize the service; the mobile communication terminal which stores an authentication key used for authentication and a program for performing an authentication process, is connected to the portable electronic device, encodes the system serial number and the authentication key to generate an integration secrete key when receiving the system serial number for authentication from the portable electronic device, transmits the generated integration secrete key to an authentication center, requests authentication of the portable electronic device and approval for relay of the mobile communication terminal, decodes a temporary integration authentication key to obtain the approval for the relay when receiving a temporary service approval key which can be used by the portable electronic device and the temporary integration authentication key for approving the relay of the mobile communication terminal, encodes the temporary service approval key, and transmits the encoded temporary service approval key to the portable electronic device; and an authentication center computer which, when receiving the integration secrete key for requesting the authentication of the portable electronic device and the approval for the relay of the mobile communication terminal from the mobile communication terminal via the communication network, decodes the integration secrete key, processes the authentication of the portable electronic device and the approval for the relay of the mobile communication terminal, encodes the temporary service approval key which can be used by the portable electronic device and the temporary integration authentication key for approving the relay of the mobile communication terminal, and transmits the temporary service approval key and the temporary integration authentication key to the mobile communication terminal.

At this time, the portable electronic device is any one of a navigation device, a digital multimedia broadcasting (DMB) device, a portable multimedia player (PMP), an MP3 player, a game device, and a digital camera.

The portable electronic device may include a wired/wireless communication unit which transmits the system serial number used for authentication to the mobile communication terminal connected by wire or wirelessly, receives the temporary service authentication key from the mobile communication terminal, and receives in real time data according to utilization of the application, to which the temporary service authentication key is applied; a key input unit which generates a key signal for utilizing the portable electronic device; an authentication unit which sets an authentication procedure of the portable electronic device, performing an authentication process, and performs a real-time security monitoring process of security policy; a storage unit which stores the registration information including the system serial number used for the authentication, information about the authentication process, and a variety of digital contents; a display unit which displays image data according to the utilization of the authenticated application on a screen; an audio output unit which outputs audio data according to the utilization of the authenticated application via a speaker; and a controller which controls the authentication of the authentication center computer via the mobile communication terminal connected by wire or wirelessly and the execution of the application according to the authentication of the authentication center computer, for the utilization of the predetermined application.

The authentication apparatus may further include a multitasking process unit which, if receiving a call over the mobile communication terminal while a predetermined application is utilized by the portable electronic device, controls a process of displaying information that the call is being received on the screen and allows a user to continuously utilize the application while a telephone conversation is made over the mobile communication terminal or gives pause to the application service which is currently being provided and resumes the application service after the telephone conversation of the user is terminated.

The authentication unit may include an authentication procedure setting portion which sets the authentication procedure of the portable electronic device via the mobile communication terminal connected by wire or wirelessly; an authentication process performing portion which performing the authentication process according to the procedure set by the authentication procedure setting portion; and a security monitoring portion which performs the real-time security monitoring process according to the security policy which is previously set in the portable electronic device.

The storage unit may include an authentication information storage portion which stores the registration information including the system serial number used for the authentication, the temporary service approval key received from the mobile communication terminal, and utilization log information according to the utilization of the application; an authentication process storage portion which stores information about the authentication process of the portable electronic device via the mobile communication terminal connected by wire or wirelessly; and a data storage portion which stores a variety of digital contents utilized in the portable electronic device.

Advantageous Effects

As described above, according to an authentication method and apparatus of a portable electronic device of the present invention, since the portable electronic device is connected to an authentication center (or a service provider) via a mobile communication terminal and the authentication of the portable electronic device is then performed, it is possible to perform a unique multimedia function of the electronic device and, at the same time, utilize the functions of the mobile communication terminal (e.g., a telephone conversation, a text message, the wireless Internet or the like).

In addition, since a serial number of a product and information necessary for authentication are previously registered in the portable electronic device and the mobile communication terminal and the authentication of the portable electronic device is performed by an authentication center, it is possible to prevent fraudulent misuse due to unauthorized duplication.

Since secure digital contents are lawfully and freely utilized, it is possible to establish a wholesome digital content market. Since it is possible to demand a reasonable price for the provision of digital contents according to the portable electronic device, it is possible to activate the digital contents market.

Since a real-time security monitoring process is performed when the portable electronic device is connected to the mobile communication terminal according to security policy set by a user, it is possible to prevent hacking of a system.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, an authentication method and apparatus of a portable electronic device according to the present invention will be described with reference to the accompanying drawings.

Figure 1:
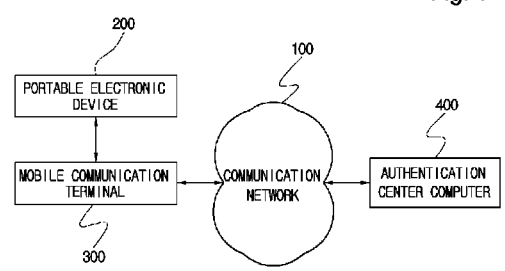
FIG. 1 is a schematic block diagram showing the configuration of an authentication apparatus of a portable electronic device according to the present invention.

FIG. 1 is a schematic block diagram showing the configuration of an authentication apparatus of a portable electronic device according to the present invention.

As shown, the authentication apparatus according to the present invention includes a communication network 100, a portable electronic device 200, a mobile communication terminal 300, and an authentication center computer 400.

The communication network 100 includes a variety of communication networks such as a telephone communication network or the wired/wireless Internet and connects the mobile communication terminal 300 and the authentication center computer 400 via a communication line to perform data communication relating to an authentication process of the portable electronic device 200 therebetween.

The portable electronic device 200 stores registration information including a system serial number used for authentication, transmits the system serial number to the mobile communication terminal 300 connected by wire or wirelessly (that is, via a cable, infrared communication or the like) when an authentication process for utilizing a predetermined application is required, receives an encoded temporary service authentication key, which is obtained by performing the authentication process through connection with the authentication center computer 400, from the mobile communication terminal, decodes the encoded temporary service authentication key, applies the temporary service authentication key to an application desired by a user, and and receives data via the mobile communication terminal 300 to utilize a service.

At this time, the portable electronic device 200 includes a variety of electronic devices such as a navigation device, a DMB device, a PMP, an MP3 player, a game device, and a digital camera and does not include a communication function for directly performing communication connection with the external authentication center computer 400 or a service provider for providing a variety of application services such as navigation and broadcasting. The portable electronic device 200 is directly connected to the mobile communication terminal 300 for directly performing communication connection with the external authentication center computer 400 or the service provider by wire or wirelessly via the cable or infrared communication to input/output of data necessary for authentication, and includes a screen larger than that of the mobile communication terminal 300 connected by wire or wirelessly.

The mobile communication terminal 300 stores an authentication key used for authentication and a program for performing an authentication process, and is connected to the portable electronic device 200. When the mobile communication terminal 300 receives the system serial number for authentication from the portable electronic device 200, the mobile communication terminal 300 encodes the system serial number and the authentication key, generates an integration secrete key, transmits the generated integration secrete key to the authentication center computer 400 via the communication network 100, and makes a request for the authentication of the portable electronic device 200 and the approval for the relay of the mobile communication terminal 300. When the mobile communication terminal 300 receives a temporary service approval key which can be used by the portable electronic device 300 and a temporary integration authentication key for approving the relay of the mobile communication terminal 300 from the authentication center computer 400, the mobile communication terminal 300 decodes the temporary integration authentication key to obtain the approval for the relay, and encodes the temporary service approval key, and transmits the encoded temporary service approval key to the portable electronic device 200.

The authentication center computer 400 receives and decodes the integration secrete key for requesting the approval for the relay of the mobile communication terminal 300 and the authentication of the portable electronic device 200 from the mobile communication terminal 300 via the communication network 100, performs the approval for the relay of the mobile communication terminal 300 and the authentication of the portable electronic device 200, encodes the temporary integration authentication key for approving the relay of the mobile communication terminal 300 and the temporary service approval key which can be used by the portable electronic device 200, and transmits the encoded data to the mobile communication terminal 300.

Figure 2:
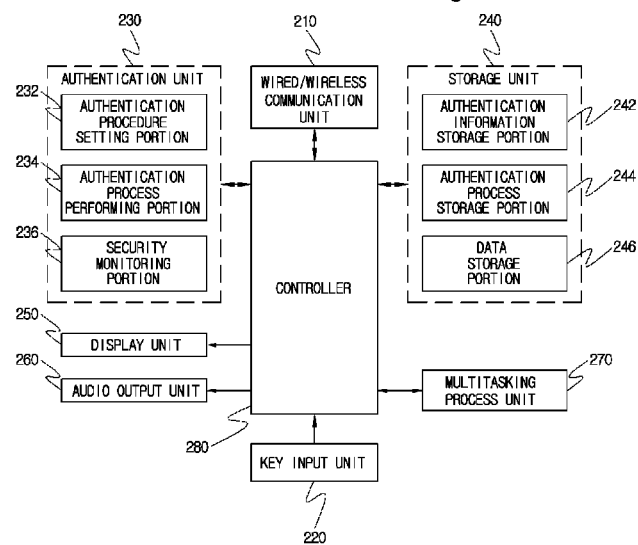
FIG. 2 is a block diagram showing in detail the configuration of the portable electronic device shown in FIG. 1.

FIG. 2 is a block diagram showing in detail the configuration of the portable electronic device 200 shown in FIG. 1.

As shown, the portable electronic device 200 includes a wired/wireless communication unit 210, a key input unit 220, an authentication unit 230, a storage unit 240, a display unit 250, an audio output unit 260, a multitasking process unit 270, and a controller 280.

The wired/wireless communication unit 210 is connected to the mobile communication terminal 300, which performs data communication with the authentication center computer 400, by wire or wirelessly. The wired/wireless communication unit 210 transmits the system serial number used for the authentication to the mobile communication terminal 300 connected by wire or wirelessly, receives the temporary service authentication key from the mobile communication terminal 300, and receives in real time data according to the utilization of the application, to which the temporary service authentication key is applied, from the mobile communication terminal 300.

The key input unit 220 generates and outputs a key signal according to a user operation for utilizing the portable electronic device 200 to the controller 280.

The authentication unit 230 sets an authentication procedure of the portable electronic device 200, performs the authentication process using the mobile communication terminal 300, and performs a real-time security monitoring process according to security policy.

At this time, the authentication unit 230 includes an authentication procedure setting portion 232 for setting the authentication procedure of the portable electronic device 200 via the mobile communication terminal 300 connected by wire or wirelessly, an authentication process performing portion 234 for performing the authentication process according to the procedure set by the authentication procedure setting portion 232, and a security monitoring portion 236 for performing the real-time security monitoring process according to the security policy which is previously set in the portable electronic device 200.

The storage unit 240 stores registration information including the system serial number used for the authentication, information about the authentication process, and a variety of digital contents.

At this time, the storage unit 240 includes an authentication information storage portion 242 for storing the registration information including the system serial number used for the authentication, the temporary service approval key received from the mobile communication terminal 300, and utilization log information according to the utilization of the application, an authentication process storage portion 244 for storing information about the authentication process of the portable electronic device 200 via the mobile communication terminal 300 connected by wire or wirelessly, and a data storage portion 246 for storing the variety of digital contents utilized in the portable electronic device 200.

The display unit 250 displays image data according to the utilization of the authenticated application on a screen, under the control of the controller 280.

The audio output unit 260 outputs audio data according to the utilization of the authenticated application via a speaker, under the control of the controller 280.

If a call is received over the mobile communication terminal 300 when a predetermined application is utilized using the portable electronic device 200, the multitasking process unit 270 controls a process of displaying information that the call is being received on a screen, and allows the user to continuously utilize the application while a telephone conversation is made over the mobile communication terminal 300 or gives pause to the application service which is currently being provided and resumes the application service after the telephone conversation is terminated, according to the setting of the user.

The controller 280 controls the authentication of the authentication center computer 400 via the mobile communication terminal 300 connected by wire or wirelessly and the execution of the application according to the authentication of the authentication center computer 400, according to the request for the use of the predetermined application of the user.

An authentication method of the portable electronic device according to the present invention will be described with reference to FIG. 3.

Figure 3:
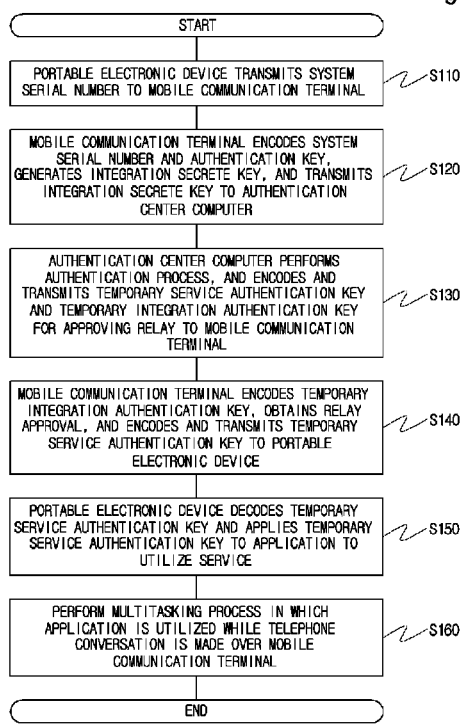
FIG. 3 is a flowchart illustrating in detail an authentication method of the portable electronic device according to the present invention.

FIG. 3 is a flowchart illustrating in detail the authentication method of the portable electronic device according to the present invention.

First, the portable electronic device 200 which requires authentication for utilizing a predetermined application (that is, digital contents) transmits the system serial number to the mobile communication terminal 300 connected by wire or wirelessly (S110).

When the mobile communication terminal 300 receives the system serial number for authentication from the portable electronic device 200, the mobile communication terminal 300 encodes the system serial number received from the portable electronic device 200 and an authentication key which is previously stored in the mobile communication terminal 300, generates an integration secrete key, performs communication with the authentication center computer 400, and transmits the integration secrete key to the authentication center computer 400 (S120), according to a procedure set in an authentication program which is previously stored therein.

When the authentication center computer 400 receives the integration secrete key from the mobile communication terminal 300 via the communication network 100, the authentication center computer 400 decodes the integration secrete key, performs authentication registration on the basis of the system serial number of the portable electronic device 200 and the authentication key of the mobile communication terminal 300, encodes the temporary integration authentication key for approving the relay of the mobile communication terminal 300 and the temporary service approval key which can be used by the portable electronic device 200, transmits the encoded data to the mobile communication terminal 300 (S130).

When the mobile communication terminal 300 receives the temporary integration authentication key from the authentication center computer 400 via the communication network 100, the mobile communication terminal 300 decodes the temporary integration authentication key, obtains approval for the relay of the mobile communication terminal, encodes the temporary service approval key, and transmits the encoded temporary service approval key to the portable electronic device 200 (S140).

When the portable electronic device 200 receives the temporary service approval key from the mobile communication terminal 300, the portable electronic device 200 decodes the temporary service approval key, performs the authentication process for utilizing the service, applies the temporary service approval key to the application desired by the user, and receives data via the mobile communication terminal 300 connected to a service provider (S150).

If a call is received over the mobile communication terminal 300 while the predetermined application is utilized via the portable electronic device 200, the portable electronic device 200 displays the information that the call is being received on the screen and performs the multitasking process which allows the user to continuously utilize the application while the telephone conversation is made over the mobile communication terminal 300 (S160).

At this time, in the multitasking process of the step 5160, the application service which is currently being provided may pause when the telephone conversation is made over the mobile communication terminal 300 and the application service may be resumed after the telephone conversation is terminated.

Next, examples of using the authentication method of the portable electronic device according to the present invention will be described with reference to FIGS. 4 and 5.

Figure 4:
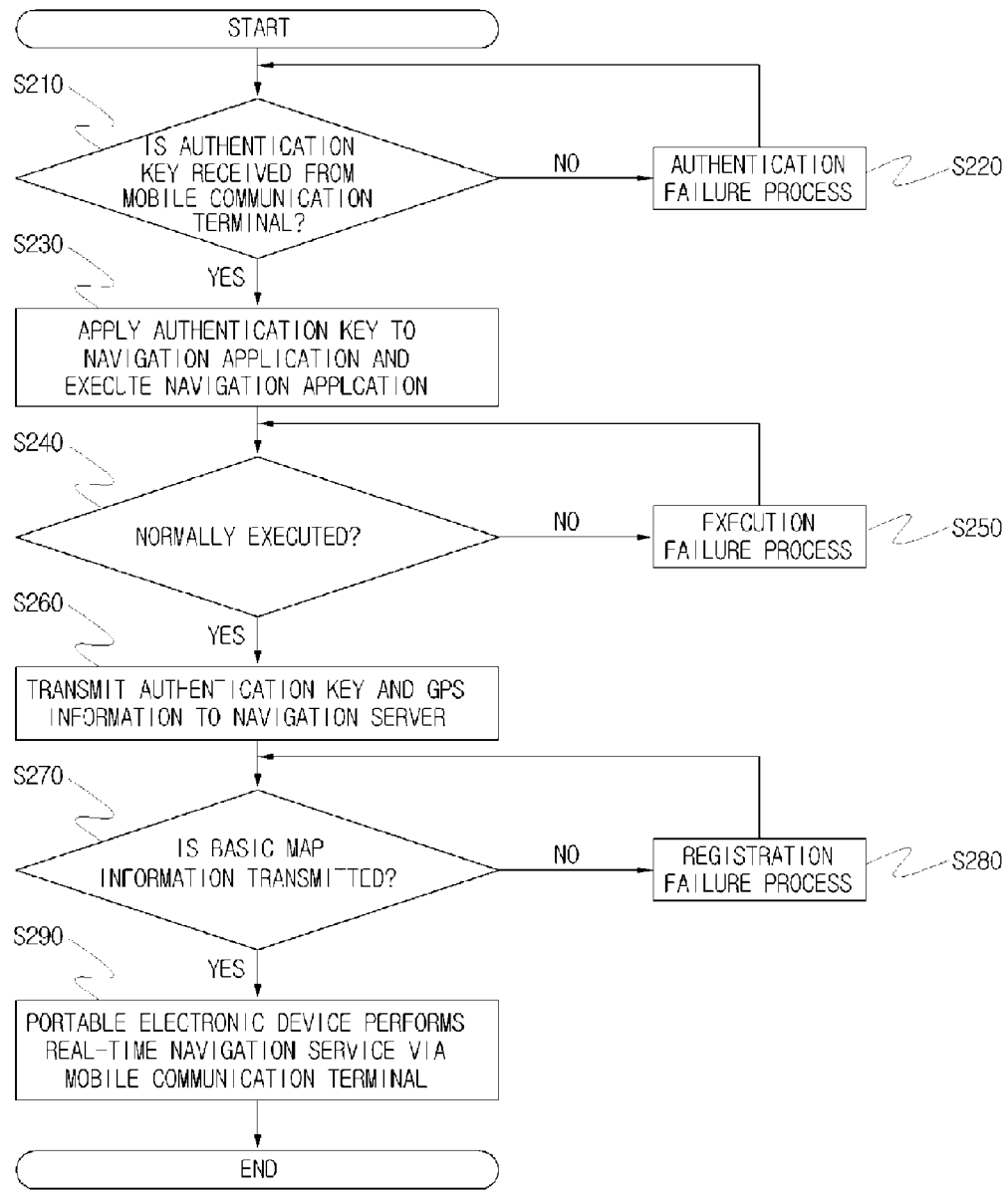
FIG. 4 is a flowchart illustrating an example of utilizing a navigation service using the portable electronic device according to the present invention.

FIG. 4 is a flowchart illustrating an example of utilizing a navigation service using the portable electronic device according to the present invention. Here, the portable electronic device 200 having a navigation function is connected to the mobile communication terminal 300.

First, the portable electronic device 200 determines whether an authentication key is received from the mobile communication terminal 300 for performing an authentication process using the authentication center computer 400 (S210) and displays information that the authentication process fails on the screen so as to be viewed by a user or outputs the information as a voice message if the authentication key is not received from the mobile communication terminal 300 (S220).

If the authentication key is received from the mobile communication terminal 300 in the step 5210, the portable electronic device 200 applies the authentication key to a navigation application to execute the navigation application (S230) and determines whether the navigation application is normally executed (S240).

If the navigation application is not normally executed, the portable electronic device 200 performs an execution failure process (S250).

If the navigation application is normally executed in the step 240, the portable electronic device 200 transmits the authentication key and GPS information to a service provider which provides a navigation service via the mobile communication terminal 300 (S260), and determines whether the service provider which provides the navigation service transmits basic map information which is previously registered by the user via the mobile communication terminal 300 (S270).

If the service provider which provides the navigation service does not transmit the basic map information which is previously registered by the user via the mobile communication terminal 300, the portable electronic device 200 performs a registration failure process (S280).

If the service provider which provides the navigation service transmits the basic map information which is previously registered by the user via the mobile communication terminal 300 in the step 5270, the portable electronic device 200 performs the navigation service via the mobile communication terminal 300 in real time on the basis of the map information (S290).

Although not shown, the portable electronic device 200 may perform the multitasking process in which a telephone conversation is made, a text message is transmitted/received, or the wireless Internet is used while the navigation application is utilized via the mobile communication terminal 300.

Figure 5:
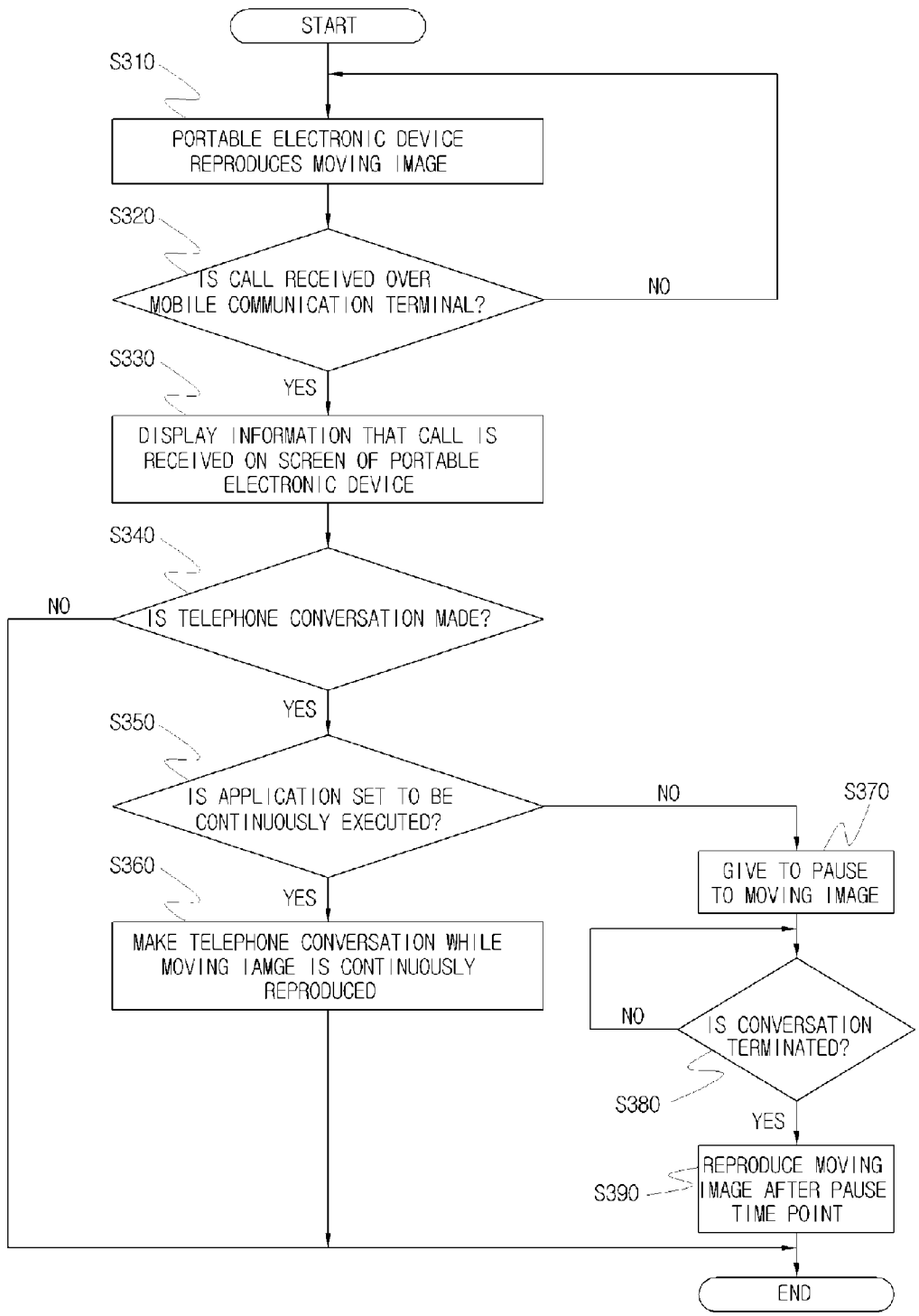
FIG. 5 is a flowchart illustrating a multitasking process when a telephone call is received over a mobile communication terminal while a moving image is reproduced using the portable electronic device according to the present invention.

FIG. 5 is a flowchart illustrating a multitasking process when a telephone call is received over a mobile communication terminal while a moving image is reproduced using the portable electronic device according to the present invention. Here, the portable electronic device 200 for reproducing a moving image file is connected to the mobile communication terminal 300.

First, while the portable electronic device 200 reproduces the moving image file according to the operation of the user (S310), it is determined whether a call is received over the mobile communication terminal 300 connected to the portable electronic device 200 by wire or wirelessly (S320).

If it is determined that the call is received over the mobile communication terminal 300, the portable electronic device 200 displays information that the call is being received on the screen so as to be viewed by the user (S330), and determines whether the user who views the information makes a telephone conversation (S340).

If it is determined that the user makes the telephone conversation, the portable electronic device 200 checks the setting of the multitasking and determines whether the application which is currently being performed is set to be continuously executed (S350).

If it is determined that the application which is currently being performed is set to be continuously performed, the portable electronic device 200 maintains a moving image reproduction state regardless of that the user makes the telephone conversation over the mobile communication terminal 300.

However, if it is determined that the application which is currently being performed is not set to be continuously performed, the portable electronic device 200 gives pause to the reproduction of the moving image and allows the user to make the telephone conversation over the mobile communication terminal 300.

Thereafter, the portable electronic device 200 determines whether the user terminates the telephone conversation over the mobile communication terminal 300 (S380). If it is determined that the user terminates the telephone conversation over the mobile communication terminal 300, the moving image is reproduced from the point of pause in the step S370 (S390).

INDUSTRIAL APPLICABILITY

As described above, according to the present invention, since a serial number of a product and information necessary for authentication are previously registered in a portable electronic device and a mobile communication terminal and the authentication of the portable electronic device is performed by an authentication center, it is possible to prevent fraudulent misuse due to unauthorized duplication. Accordingly, it is possible to lawfully and freely use secure digital contents. Since a real-time security monitoring process is performed when the portable electronic device is connected to the mobile communication terminal according to security policy set by a user, it is possible to prevent hacking of a system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An authentication method of a portable electronic device, the authentication method comprising:
   (1) at the portable electronic device which requires authentication for utilizing a predetermined application and does not include a communication function for directly performing communication connection with authentication center or service provider, transmitting a system serial number stored previously to a mobile communication terminal connected by wire and wirelessly;
   (2) at the mobile communication terminal, encoding the system serial number received from the portable electronic device and an authentication key previously stored in the mobile communication terminal, generating an integration secrete key, performing communication connection with an authentication center computer, and transmitting the integration secrete key to the authentication center computer;
   (3) at the authentication center computer, decoding the integration secrete key received from the mobile communication terminal, performing authentication registration, encoding a temporary service approval key which can be used by the portable electronic device and a temporary integration authentication key for approving relay of the mobile communication terminal, and transmitting the temporary service approval key and the temporary integration authentication key to the mobile communication terminal;
   (4) at the mobile communication terminal, decoding the temporary integration authentication key received from the authentication center computer, obtaining approval for the relay of the mobile communication terminal, encoding the temporary service approval key, and transmitting the temporary service approval key to the portable electronic device;
   (5) at the portable electronic device, decoding the temporary service approval key received from the mobile communication terminal, performing authentication for utilizing a service, and applying the temporary service approval key to an application desired by a user to utilize the service; and
   (6) at the portable electronic device, if receiving a call over the mobile communication terminal while a predetermined application is utilized by the portable electronic device, displaying information that the call is being received on a screen and performing a multitasking process which allows a user to continuously utilize the application while a telephone conversation is made over the mobile communication terminal.

2. The authentication method according to claim 1, wherein, in the multitasking process of the step (6), the application service which is currently being provided pauses when the telephone conversation is made over the mobile communication terminal and is resumed after the telephone conversation of the user is terminated.

3. An authentication apparatus of a portable electronic device, the authentication apparatus comprising:

a communication network which performs data communication relating to authentication via a plurality of communication lines;

the portable electronic device which stores registration information including a system serial number used for authentication, transmits the system serial number to a mobile communication terminal connected by wire or wirelessly when authentication is required, receives an encoded temporary service authentication key from the mobile communication terminal, decoding the encoded temporary service authentication key, and applies the decoded temporary service authentication key to an application desired by a user to utilize the service, if receiving a call over the mobile communication terminal while a predetermined application is utilized, displaying information that the call is being received on a screen and performing a multitasking process which allows a user to continuously utilize the application while a telephone conversation is made over the mobile communication terminal;

the mobile communication terminal which stores an authentication key used for authentication and a program for performing an authentication process, is connected to the portable electronic device, encodes the system serial number and the authentication key to generate an integration secrete key when receiving the system serial number for authentication from the portable electronic device, transmits the generated integration secrete key to an authentication center, requests authentication of the portable electronic device and approval for relay of the mobile communication terminal, decodes a temporary integration authentication key to obtain the approval for the relay when receiving a temporary service approval key which can be used by the portable electronic device and the temporary integration authentication key for approving the relay of the mobile communication terminal, encodes the temporary service approval key, and transmits the encoded temporary service approval key to the portable electronic device; and an authentication center computer which, when receiving the integration secrete key for requesting the authentication of the portable electronic device and the approval for the relay of the mobile communication terminal from the mobile communication terminal via the communication network, decodes the integration secrete key, processes the authentication of the portable electronic device and the approval for the relay of the mobile communication terminal, encodes the temporary service approval key which can be used by the portable electronic device and the temporary integration authentication key for approving the relay of the mobile communication terminal, and transmits the temporary service approval key and the temporary integration authentication key to the mobile communication terminal.

4. The authentication apparatus according to claim 3, wherein the portable electronic device is any one of a navigation device, a digital multimedia broadcasting (DMB) device, a portable multimedia player (PMP), an MP3 player, a game device, and a digital camera.

5. The authentication apparatus according to claim 3, wherein the portable electronic device includes:

a wired/wireless communication unit which transmits the system serial number used for authentication to the mobile communication terminal connected by wire or wirelessly, receives the temporary service authentication key from the mobile communication terminal, and receives in real time data according to utilization of the application, to which the temporary service authentication key is applied;

a key input unit which generates a key signal for utilizing the portable electronic device;

an authentication unit which sets an authentication procedure of the portable electronic device, performing an authentication process, and performs a real-time security monitoring process of security policy;

a storage unit which stores the registration information including the system serial number used for the authentication, information about the authentication process, and a variety of digital contents;

a display unit which displays image data according to the utilization of the authenticated application on a screen;

an audio output unit which outputs audio data according to the utilization of the authenticated application via a speaker;

a controller which controls the authentication of the authentication center computer via the mobile communication terminal connected by wire or wirelessly and the execution of the application according to the authentication of the authentication center computer, for the utilization of the predetermined application; and a multitasking process unit which, if receiving a call over the mobile communication terminal while a predetermined application is utilized by the portable electronic device, controls a process of displaying information that the call is being received on the screen and allows a user to continuously utilize the application while a telephone conversation is made over the mobile communication terminal or gives pause to the application service which is currently being provided and resumes the application service after the telephone conversation of the user is terminated.

6. The authentication apparatus according to claim 5, wherein the authentication unit includes:

an authentication procedure setting portion which sets the authentication procedure of the portable electronic device via the mobile communication terminal connected by wire or wirelessly;

an authentication process performing portion which performing the authentication process according to the procedure set by the authentication procedure setting portion; and a security monitoring portion which performs the real-time security monitoring process according to the security policy which is previously set in the portable electronic device.

7. The authentication apparatus according to claim 5, wherein the storage unit includes:

an authentication information storage portion which stores the registration information including the system serial number used for the authentication, the temporary service approval key received from the mobile communication terminal, and utilization log information according to the utilization of the application;

an authentication process storage portion which stores information about the authentication process of the portable electronic device via the mobile communication terminal connected by wire or wirelessly; and a data storage portion which stores a variety of digital contents utilized in the portable electronic device.

* * * * *